United States Patent Office 3,208,822
Patented Sept. 28, 1965

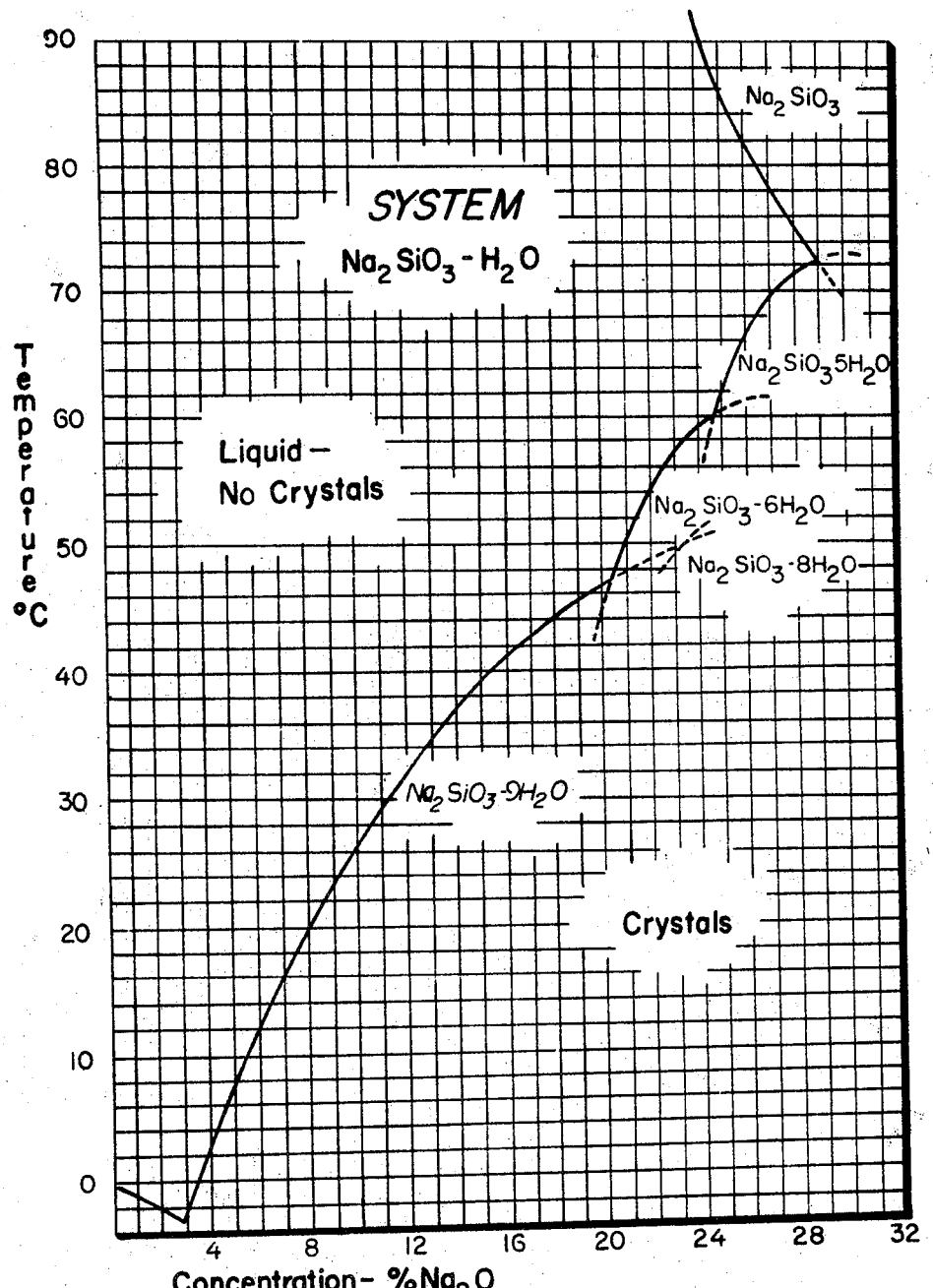
FIG I

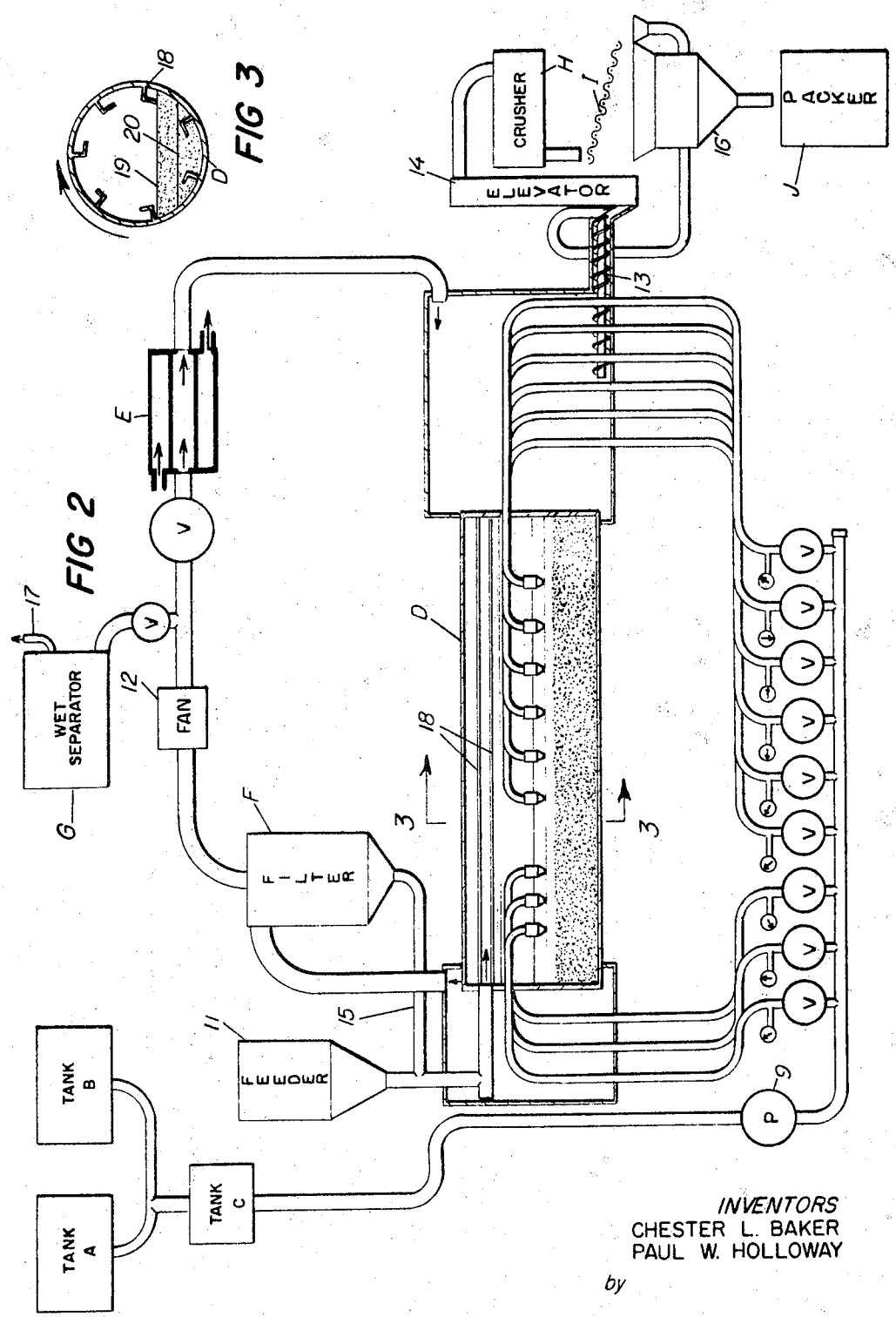

3,208,822
SPHERICAL PARTICLES OF ANHYDROUS SODIUM METASILICATE AND METHOD OF MANUFACTURE THEREOF
Chester L. Baker, Narberth, and Paul W. Holloway, Wayne, Pa., assignors to Philadelphia Quartz Company, Philadelphia, Pa., a corporation of Pennsylvania
Filed Aug. 16, 1961, Ser. No. 132,279
8 Claims. (Cl. 23—110)

This application is a continuation-in-part of application, Serial No. 51,436 filed by Chester L. Baker on August 23, 1960, now abandoned.

This invention generally relates to a new form of anhydrous sodium metasilicate and the process for making same. More particularly this invention relates to a new form of anhydrous sodium metasilicate which is dense, rapidly soluble, and substantially free of dust, water insoluble matter and other impurities and which possesses increased commercial desirability.

BACKGROUND

The anhydrous sodium metasilicate which is commercially available today is manufactured by melting together the necessary raw materials (usually soda ash and refined glass sand) at high temperatures, or sintering at somewhat lower temperatures near the melting point of the anhydrous sodium metasilicate. In either case, the product is allowed to crystallize into a mass which uually includes all of the original impurities of the reactants along with some refractory material from the furnace walls. The mass of crystallized product must then be crushed or ground to the desired particle size range with the result that the ground product unavoidably contains a considerable amount of dust, even though attempts are made to regulate the particle size range by careful screening. Another difficulty with the presently available product is that when it is dissolved in water there is an appreciable insoluble residue, often amounting to over a 0.05%. This insoluble residue is a combination of unmelted sand residue, high-ratio slowly soluble glass particles, refractory particles, and the flocculent reaction products of the natural impurities of the sand and water. While this flocculent material is actually minor in proportion by weight, it is extensive in size and readily visible. It is, however, soft and generally causes no difficulty in cleaning operations.

It might appear that one could prepare a clarified solution of sodium metasilicate and through suitably controlled evaporation produce crystals which could be separated from the mother liquor and dried to produce a commercial product. However, as a practical matter, there are a number of difficulties which have prevented this approach from being used commercially. The solubility curve for sodium metasilicate in water from $-10°$ C. to $90°$ C. has been worked out by Baker and Jue (J. Phys. Chem. 42, 165, 1938). A copy of this diagram is shown as FIGURE 1. It will be noted in this diagram that anhydrous sodium silicate is a stable crystalline phase above about $72°$ C. When one attempts to concentrate a solution of sodium metasilicate containing crystals of anhydrous sodium metasilicate the heat transfer surfaces quickly become coated with a hard scale of anhydrous sodium metasilicate which effectively prevents economical heat transfer. For example, the steam tubes in a commercial evaporator will remain effective for only a very short period of time. The reason for this behavior is readily apparent from the above FIGURE 1 since it is shown there that the solubility curve for anhydrous sodium metasilicate is retrograde in character.

Furthermore, the crystals of anhydrous sodium metasilicate formed in this way are extremely small so that it is difficult to separate them from their mother liquor by conventional methods and to dry them. Moreover, when they are obtained from such a solution the product is too fine for most commercial applications.

It is possible to evaporate a solution of sodium metasilicate on a drum dryer to yield a flaked end product, but here again, because of the tendency for the surface of the drum to acquire a tightly adherent scale of anhydrous metasilicate with a low heat transfer coefficient, it is practically impossible to obtain a product with flakes much more than about 0.01 inches thick. These flakes tend to contain several percent of residual moisture which must be removed by a second operation, and finally the product produced in this manner is too bulky and too dusty for commercial acceptance.

If one attempts to dehydrate a sodium metasilicate solution by spray drying he finds that higher temperatures are required than are normally acceptable in practice if one is to obtain a completely anhydrous product. Also the spray dried product is too dusty to be commercially acceptable.

Manufacturers who compound cleaning compositions and who use anhydrous sodium metasilicate as one of the components of their compositions have a number of objections insofar as presently available commercial sodium metasilicates are concerned. First of all such manufacturers want a product which will not be dusty and which will not raise dust problems. Secondly, manufacturers want a more or less uniformly sized product which can be easily mixed with the other components and which will not easily separate itself from the other components by virtue of size differences. Thirdly, manufacturers want a sodium metasilicate which is white rather than blue or gray colored so that when the metasilicate particles are mixed in with the other white components the entire powdered batch of cleaning material will appear to be of uniform composition and color. Fourthly, they want the product to dissolve to a clean solution. Fifthly, they want a product free of $CO_2$ and $SO_2$ or other soluble impurities. All of these factors, although not critical from the standpoint of the utility of the cleaning composition, are very important from the standpoint of consumer acceptance and commercial success in the marketplace.

OBJECTS

It is therefore a primary object of this invention to provide a novel form of substantially anhydrous sodium metasilicate and a method for preparing same.

A further object of this invention is to provide a new form of anhydrous sodium metasilicate which is dense, rapidly soluble, more uniformly sized, of improved color, substantially free of dust and impurities and which possesses increased commercial desirability.

Another object of this invention is to provide a novel process and apparatus for producing anhydrous sodium metasilicate of the above-mentioned characteristics.

These and other objects of the invention will appear in the following description and appended claims, reference being had to the accompanying drawings forming a part of this specification.

THE INVENTION BROADLY

We have now found that the aforementioned disadvantages and shortcomings of the prior art anhydrous sodium metasilicate products can be overcome by carrying out a process which broadly comprises the following series of steps:

(a) Introducing a plurality of small solid particles of anhydrous sodium metasilicate into a coating zone;
(b) Heating the moving mass of anhydrous particles of sodium metasilicate substantially to the boiling point of the sodium metasilicate liquor;
(c) Introducing into said coating zone aqueous sodium metasilicate liquor;

(d) Causing a liquid film of said aqueous sodium metasilicate to envelope at least a substantial portion of the exterior surface of said small particles of solid anhydrous sodium metasilicate;

(e) Maintaining the moving mass of the aforesaid film-covered particles above the boiling point of the aqueous sodium metasilicate liquor by applying additional heat so as to cause evaporation of water from said film, thus causing said liquid film to change to a solid film of anhydrous sodium metasilicate; and (f) Repeating the above coating and film conversion steps any desired number of times until the size of the anhydrous sodium metasilicate particles has increased to the desired extent.

Successive addition of increments of hydrous sodium metasilicate solution, followed in each case by their evaporation on the particle surface, yields a particle of increased size comprising successive layers of anhydrous sodium metasilicate crystals deposited around a central core. By our process it is possible to produce a product which is substantially dust free, dense, free of either soluble or insoluble impurities, rapidly soluble and commercially acceptable. The problems of scale formation on heat transfer surfaces are completely avoided.

THE INVENTION MORE SPECIFICALLY (a)

The plurality of small particles of anhydrous sodium metasilicate may be obtained from one of the well known furnace methods (e.g. see U.S. Patent No. 2,239,880) or they may consist of recycled rejected material, i.e. undersized or oversized material from the instant process which has been crushed. It is obvious that as the initial solid particles become more completely replaced by recycled core material, the proportion of insoluble material from the furnace product will be reduced to negligible proportions and the product will become completely soluble.

The base particles may be of any desired size range depending on what is available and on the particle size required in the final product. Naturally, one would usually start with base particles smaller than the size desired in the product. In ordinary practice, these base particles are likely to be fines rejected because of their small size or oversize particles which have been crushed and returned to the cycle. By way of example, only, the preferred particles could be within the size range of 48 mesh and smaller.

The coating zone is not limited to any one particular kind of apparatus, but preferably consists of a rotating cylinder, since this is an economical, convenient and readily available type of apparatus. The size is primarily a matter of choice, depending on the desired output as well as the drying capacity available.

It is preferable to maintain the plurality of small particles in an agitated state so that the surfaces of the individual particles are being turned in different directions during the course of subsequent treating operations. The means employed to maintain the plurality of particles in the agitated state is not critical, although a rotating cylinder (as aforementioned) has usually been found to be quite satisfactory, particularly when the interior surface of the rotating cylinder is provided with a plurality of semi-lifting means for lifting and then dropping the particles.

Another desirable means of agitating and treating the particles is to employ the fluidized bed technique whereby superheated steam would be used as the fluidizing medium.

(b)

The plurality of small particles of anhydrous sodium metasilicate is raised to a temperature near and preferably above the boiling point of the sodium metasilicate liquor to be used as the coating solution. Since the system is essentially at atmospheric pressure and the atmosphere in the dryer is preferably 100% steam, that is with a minimum of extraneous air, any particles at a temperature below the boiling point of the saturated metasilicate liquor will tend to condense water from the steam and become wet and eventually sticky or pasty. Surprisingly, we have found that if we do maintain the bed at substantially the boiling point of the liquor being added or present as a saturated solution on the particles, the bed will remain granular and free flowing. It is therefore preferable never to add so much liquor at any one point that the temperature of the mass of particles falls below the boiling point of the liquor in contact with the crystal particles. However, additional heat may be applied during this drying step to speed up and complete the dehydration of the film before additional liquor is added to form a new film.

(c)

The plurality of said small particles (preferably while in an agitated state) are contacted with aqueous sodium metasilicate solution and preferably a clarified solution. Sodium metasilicate solutions of nearly any desired concentration may be used in accordance wits this invention. It is possible that under some circumstances, solutions with a density of 10° Baumé or lower may be available (e.g. as a by-product) from other processes. On the other hand, it is often desirable to causticize an ordinary liquid sodium silicate of commerce and these causticized solutions will normally be in the range of 30–55° Baumé, without dehydration or dilution. They are very acceptable and tend to be preferred in our process.

The use of 55° Baumé sodium metasilicate or a liquid phase of lower gravity is economical since it can be prepared without evaporation of water in a concentration step. It is also preferable to use a liquor of similar gravity since liquors of higher gravity wet the hot anhydrous sodium metasilicate less readily and they tend to form heavier films which remain sticky and cause aggregation. On the other hand, the use of metasilicate liquors below about 50° Baumé, while wetting the hot anhydrous metasilicate more readily, increases the amount of heat to remove the excess water in drying the film and thus tends to increase the cost of the operation.

(d)

The coating solution of aqueous sodium metasilicate is contacted with said plurality of small particles of solid anhydrous sodium metasilicate in an amount sufficient and for a long enough time to cause said coating solution to cover at least a substantial portion of the surface of said particles. The particles may be coated with a film even up to the point at which the particles would cease to be free flowing. By maintaining the plurality of particles in an agitated state (e.g. as by tumbling in a rotating cylinder) the particles are more evenly and uniformly coated with liquid films. The coating solution is preferably not introduced in such large quantities that gross agglomeration occurs.

(e)

Heat is preferably applied to the moving or agitated mass of particles by a stream of heated gas. The film or coating of hydrous sodium metasilicate is thus dehydrated so as to thereby form a solid film or coating on the surface of the particles.

The hot gases are preferably free of $CO_2$ or other acidic components as these tend to react and form salts with the alkali ions in the metasilicate. We prefer to use superheated steam as the heating gas as this may be recycled again an dagain with part of the water vapor removed in each cycle. By using steam we avoid renewing $CO_2$ or other impurities in the drying gas. However, it has been found that sodium metasilicate does not take up $CO_2$ to any extent above about 200° C. and one may therefore use gases contaminated with $CO_2$ etc. at temperatures above about 200° C.

During the drying process using superheated steam, the particles remain at the boiling point of the liquor (about 100–180° C.) until most of the water is evaporated. At low moisture contents the particles may go considerably above the boiling point and in general we find a free-flowing condition is maintained if the observed temperature of the bed in the container is above about 130° C. and below the melting point of the anhydrous metasilicate.

When a dry $CO_2$-free gas is employed, water will of course be removed below the boiling point of the liquor as will be obvious to those skilled in these arts. We consider such procedures as equivalent processes.

(f)

Successive coatings or films may be formed on the solid particles by repeating the steps outlined above. The size of the final particles is thereby only governed by the number of coatings which the particles receive.

Naturally some final particles will exhibit more than one center of growth as a small amount of agglomeration may occur even under the best conditions of operation; but essentially our process is one of coating individual particles and we desire to avoid aggregation insofar as we may.

The walls of the coating and dehydrating zones, being generally at a lower temperature than the stream of heated gas used in dehydrating, tend to remain free from deposits, coatings and incrustations. As a matter of fact, any coating which does form on these walls only serves to insulate the heating and dehydration zone and retain the heat where it is desired and useful.

By a suitable control of the pitch, internal cylinder structure, loading rate, rotating speed or other mixing speed, temperatures and feed and discharge rates, it is possible to control the particle size and production rate of a commercially desirable product in a continuous operation. This product may then be screened and sized and the oversized particles crushed and combined with the finer particles for return to the process.

EXAMPLES IN GENERAL

The following examples are illustrative of preferred embodiments of the present invention. It should be understood that these examples are not intended to limit the invention and that obvious changes may be made by those skilled in the art without changing the essential characteristics and the basic concept of the invention. The parts and percentages are by weight, the temperature is room temperature and the pressure is atmospheric, unless otherwise indicated. The mesh and mesh sizes mentioned hereafter refer to Tyler standard screen-scale sieves. The average apparent bulk density was determined as the mean of the tamped and untamped density as found by weighing 100 ml. of the material poured gently down the side of a 100 ml. graduate. The minimum tamped volume of this weighed sample was found by tamping the graduate on a hard rubber base.

Example 1

100 parts of anhydrous sodium metalsilicate fines prepared by the reaction of soda ash with glass sand, which were rejected in the regular production of anhydrous sodium metasilicate by the methods used by Curll in Patent 2,239,880 (95% past 100 mesh screen and ranging down in size to 325 mesh) were used as a starting material and were agitated with a mixing device in a container while 164 parts by volume of a solution of sodium metasilicate at 50° Baumé (measured at 21° C.) were added dropwise. The temperature during addition was held above about 130° C. and the addition finished at 170 to 180° C. The addition of the aqueous solution was made over a period of 50 minutes.

This product was found to have an excellent dead white color, practically no fines less than 65 mesh and the insoluble content was reduced about 50% which is much below what would be expected from the original metasilicate fines present. The final weight of material was 100% greater than the initial weight of the fines.

Example 2

The product of our invention may be produced commercially in a plant as described in FIGURE 2. In this continuous production unit, Tank A was filled with "E" sodium silicate sold by the Philadelphia Quartz Company and composed of 8.6% $Na_2O$ with a ratio of $SiO_2:Na_2O$ on a weight percent basis of 3.22. Tank B contained liquid caustic (50% NaOH) as sold by Solvay Process Co. and this liquid was heated by steam to about 70° C. with steam coils in the Tank C to provide a supply of liquor with a mol ratio of 1.008:1.000 at about 50° Bé. containing 19.75% $Na_2O$, 18.89% $SiO_2$, 0.08% $CO_2$ and having a clearness of 7 cm. and a turbidity of about 34 p.p.m. using a Coleman Nepho Colorimeter Model 9. This liquor was pumped from Tank C by pump 9 and introduced through nine lines 10 where it was sprayed at nine points into the 3.2 ft. dia. x 40.7 ft. long rotary dryer D, set at a slope of ⅜ inch per foot and rotating at 7 r.p.m. containing 6000 lbs. of the re-cycled anhydrous sodium metasilicate. The nine spray nozzles were flooding nozzles with a flat spray pattern obtained from Spraying Systems Co. The nozzle orifice sizes and the location measured from the feed end of the dryer were as follows:

| Nozzle number | Distance (feet) | Nozzle Orifice Diameter (inches) |
|---|---|---|
| 1 | 2.5 | 0.031 |
| 2 | 13.3 | 0.040 |
| 3 | 18.3 | 0.040 |
| 4 | 23.3 | 0.045 |
| 5 | 25.8 | 0.045 |
| 6 | 28.3 | 0.045 |
| 7 | 30.8 | 0.063 |
| 8 | 33.3 | 0.063 |
| 9 | 35.8 | 0.078 |

Fines of the size range set forth in the table below were used initially and were introduced into the dryer through feeder 11.

TECHNICAL ANHYDROUS SODIUM METASILICATE FINES

| | |
|---|---|
| $Na_2O$ ___percent__ | 50.89 |
| $SiO_2$ ___do____ | 48.06 |
| Ratio (mol basis) 1.023 $Na_2O$:1.000 $SiO_2$. | |
| $CO_2$ ___percent__ | 0.86 |
| $SO_3$ ___do____ | 0.09 |
| Ignition loss ___do____ | 0.88 |
| Insoluble ___do____ | 0.03 |
| Bulk density: | |
|   Tamped ___lb./ft.³__ | 94.6 |
|   Untamped ___lb./ft.³__ | 75.7 |

Physical appearance—Fine white powder with greenish cast.

Screen analysis: Percent
- −10+65 M ___ 23
- −10+65 M ___ 23
- −65 M ___ 77
- −100 M ___ 38.9

For each 100 pounds of recycled anhydrous sodium metasilicate fed at a rate of 300 lbs./hr., 100 pounds of solid sodium metasilicate were sprayed in (as 730 pounds of the sodium metasilicate liquor). The temperature of the solids entering dryer D was about 32° C., the temperature of the solids leaving dryer D was about 200° C., providing an essentially anhydrous sodium metasilicate product. The superheated steam heating gas was heated in an indirect heater E to 345° C. and drawn countercurrently through the dryer D by a fan 12 at 5500 c.f.m. The temperature of the gas leaving dryer D was about 150° C. The exhaust gases, after being drawn through dryer D by fan 12 are then passed through a dry dust collector F. The dust and fines collected in F are recycled through the line 15 and feeder 11 to the rotary dryer D. The hot gases from collector F are divided into two streams with part being vented into the wet separator G where most of the steam is condensed and the non-condensable gas passed to the atmosphere through vent 17 while the major portion is drawn by fan 12 and reheated in the heater E before again being cycled through the rotary dryer D. This is a major advantage of our process since the condensed steam carries with it any fine alkali and only dust-free non-condensable gas is vented through 17.

A portion of the solid product from the rotary dryer D was passed through a screw conveyor 13 and elevated by elevator 14 to a crusher H and thence to screen I, where the larger particles, about one-fourth to one-half of the total, were separated and recycled by screw 13 to the crusher. Fines, if any, were recycled to the feed end of the rotary dryer D.

While in this series of runs the product was discharged at a temperature of 200–250° C., the product may be cooled by any acceptable means as in a rotary cooler placed ahead of screw 13 or by introducing, for example, a further spray of liquid metasilicate just prior to discharge. This would also increase the rate of production of anhydrous sodium metasilicate.

Off-standard material may be used as desired. For instance, if necessary to change the ratio, it may be dissolved, the ratio corrected, and the liquor returned to the process as spray feed. If it is merely poorly sized, it may be recycled as dry feed. Product within the desired size range is collected in hopper 16 and sent to packer J.

This product after continuous operation for a time to replace essentially all of the initial fines, had approximately the following analysis:

50.42% $Na_2O$.
48.11% $SiO_2$.
0.63% $CO_2$.
0.06% $SO_3$.
1.26% ignited loss.
20 p.p.m. turbidity.
0.06% insoluble.
1.024 $Na_2O$:1.000 $SiO_2$ (mol basis).
Color—white.

Screen analysis:                                     Percent
+10 M ---------------------------------- 41.1
−10+65 M ------------------------------- 58.9
−65 M ----------------------------------  0.0

In the test for turbidity 40 grams of the product were placed in a beaker, 200 ml. of cold water were poured in carefully and the solution heated without agitation at 42° C. for one hour.

FIGURE 3 is a cross section of the rotary drum dryer D. Line 20 represents the level of the Metso fines initially. These fines are picked up by the metal plates 18 which are about 3″ high and dropped back through the heated gases which are passing through the center of the dryer. At specified points in the dryer, the liquid sicilate is added as a spray or a stream where greatest agitation occurs in the rotary dryer. This is where the maximum solids are falling back into the bed. Line 19 represents the level at the dicharge end.

This example was carried out on a relatively large scale to secure engineering data for a full scale plant. Because of our interest in obtaining material for recycling, the crusher was placed ahead of the single screen. In a full scale operation, we would expect to place the crusher after a set of multiple screens, thus taking full advantage of the fundamental characteristics of this invention which permits the production of a high proportion of material of marketable size without either large amounts of fines or oversize fractions.

Additionally, we note that the product of this example will be further improved in a full scale process. For instance, the short runs and intermediate cleaning operations caused a larger amount of turbidity and insoluble than should be found in our best product. In our best operation this insoluble will be practically zero. Also, because of the emphasis on engineering data for the design of a pilot plant, it was not considered important to minimize $CO_2$ and a high proportion of air with a normal $CO_2$ content was used in the heating gas. This resulted in a high value for $CO_2$ in the product. When the air content of the gas is reduced to zero, the total $CO_2$ should not exceed about 0.20%.

Example 3

The fines (having the size range and analysis set forth in Example 2) of anhydrous sodium metasilicate were passed through a mixing and conveying screw about 12 feet long. Near the feed end, sufficient sodium metasilicate solution at 50° Baumé was fed into the fines while they were being mixed so that the product at the discharge end was damp but still free-flowing. This product was dried (at about 200° C.) in a pan and screened. The product of the required size was packaged for sale and the residue was crushed or ground and recycled as described above. By this means, the product became quite white and the insoluble content was markedly reduced and the waste fines were agglomerated to a useful size without undue cost.

Example 4

A tank of sodium metasilicate liquor having a mole ratio of 1.071 $Na_2O$:1.000 $SiO_2$ and containing 0.05% $CO_2$ was again provided as in Tank C of FIGURE 2. The gravity could be varied by dilution with water but in this case was close to 55° Baumé (determined at 21° C.). Anhydrous sodium metasilicate feed was usually the recycled −20 mesh product from the screening operation. The liquor was sprayed into the rotary dryer D through a flat spraying nozzle, provided by the Spraying Systems Co., centrally located in the axis of the dryer and directed to spray through the cascading particles at the 3–4 o'clock position. The pipes leading to the nozzles as well as the nozzles were water-cooled by water flowing in concentric piping. Variations from the dryer described in FIGURE 2 were the following:

Nozzle 1 at 2.5 ft. from the feed end having an opening 0.028 in.

Nozzle 2 at 13.3 ft. from the feed end having an opening 0.028 in.

Nozzle 3 at 28.3 ft. from the feed end having an opening 0.047 in.

Nozzle 4 at 33.3 ft. from the feed end having an opening 0.063 in.

Nozzle 5 at 35.8 ft. from the feed end having an opening 0.078 in.

The total length of the 3.2 ft. diameter dryer was 40.7 ft. and the discharge opening was 20 to 22 inches in diameter. The dryer slope was set at 5 inches over the total length and the rate of rotation was about 11.5 r.p.m.

In order to increase and promote agitation, 3 inch flights were installed within the dryer, starting about 1 ft. after the first nozzle and with short breaks before and after each successive nozzle.

In the operation of the test it was found best to add only enough liquor through nozzle 1 to keep down the dust. The feed was then heated sufficiently so that at the distance of 13 ft., that is at the second nozzle, the particles were above the boiling point of the liquor (135° C. to 150° C. in this case) and the latent heat provided in this way evaporated the excess water out of the coat as it was applied at spray station 2. The heat content was again built up to care for the coating applied at spray station 3, and so on. It was found helpful to insulate the dryer shell. The feed present was sufficient to form a layer 5 inches deep at station 1 and 11 inches deep at the last spray station.

In one day of this run 15,550 pounds of product having the following properties were obtained:

| | |
|---|---|
| $CO_2$ percent | 0.27–0.17. |
| $H_2O$ percent | 1.66–1.86. |
| Insoluble, percent | 0.02–0.01. |
| Mole ratio: | |
| $Na_2O:SiO_2$ | 1.050–1.054. |
| Tamped bulk density | 85.1–83.4. |
| Clearness | 36 cm.+. |
| Screen distribution: | |
| +10 M | 38.5–42.5. |
| −10+20 M | 59.3–56.9. |
| −20+48 M | 2.1–0.6. |
| −48 M | Trace. |

In producing this material, the exhaust gas at the solid feed end of the dryer was maintained at a temperature between 140° C. and 145° C. The temperature of the entering gas at the discharge end was held between 365 and 380° C. so that the product when discharged had a temperature of about 195° C. The anhydrous metasilicate was charged at a rate between 280 and 420 pounds per hour and the liquor was added at a rate equivalent to from 121 to 136% of the dry feed on an anhydrous solids basis. The dryer discharge varied from 662 to 930 pounds per hour. The liquor before spraying had a temperature at the pump of 85° C., the flow at nozzle 1 was kept too low to be measured with the rotometer but the relative flow at nozzle 2 was 3–4 units compared to 5 units at 3; 4.5 to 5.5 at 4 and 4.5 to 6 units at 5.

The vapor used to heat the bed and carry off the evaporated water was itself 80 to 85% water and the rest air; the flow was about 4450 to 5000 c.f.m.

As a result of the longer sojourning time in the dryer, the particles increased in size as the ratio of new production to net dry feed increased. The fraction −20+48 mesh decreased and the fractions +10 M and −10+20 M increased.

*Example 5*

In this run the equipment was the same as that in Example 4 except that the pitch of the dryer was 6 inches and the nozzle at the liquor station 1 had an opening of 0.024 inches; that at 2 had an opening of 0.02 inches, and nozzles 3, 4 and 5 had openings of 0.040 inches. When excessive liquor was added at the feed end or condensation developed on the sides of the dryer at the feed end the solid anhydrous metasilicate particles at that point became damp and sticky. Under such conditions it was useful to rap the iron shell at intervals of time and space to avoid a buildup on the shell itself. Insulation of the feed end helped to avoid possible condensation of the vapor and the necessity for these precautions.

As a rule of thumb, experience in this test showed that 47° Baumé liquor measured at 21° C. could be added at a rate of 10% of the net dry feed rate at the feed end and 15% at the discharge end, all on an anhydrous metasilicate basis when using a vapor of 30 to 60% of water. While the feed particles were more readily wetted by a liquor having a Baumé of 42.5° measured at 21° C. more water had to be evaporated in the dryer and by experience it was found that a 50° Baumé liquor was a good compromise.

The bed of anhydrous metasilicate varied in depth and character. At the 1 nozzle station, the bed was two inches deep and wet and the shell tended to be wet unless it was insulated. At the second nozzle the bed was eight inches deep and the anhydrous metasilicate particles were dry, granular and uniform without any evidence of building up on the shell. At the third station, the bed was nine inches deep and in the same condition. At the fourth nozzle station, the bed was eleven inches deep and dry but some buildup occurred on the shell showing that at that point the rate of addition of liquor was about the maximum desirable. At the last nozzle the bed was thirteen inches deep and again buildup occurred in small amounts showing that the rate of liquor addition was somewhat too high. These observations were made at the end of the run.

Initially, 1000 to 1100 pounds of dry anhydrous metasilicate were added per hour with sodium metasilicate feed liquor having a mole ratio of 1.076 $Na_2O:1SiO_2$ and a gravity of 45–47° Baumé measured at 21° C. producing 200 pounds per hour of new anhydrous sodium metasilicate. The temperature at the feed end was 127° C. and that at the discharge end was 268° C. The vapor flow was about 4800 c.f.m. In the final period of the run, the feed rate was 400 pounds per hour with a production of 355 pounds per hour using a vapor flow of only 4000 c.f.m. of vapor containing 80 to 90% water and the liquor feed having the same ratio was used at 51° Baumé, again measured at 21° C. The temperature at the feed end was 140° C. and that at the discharge end was 362° C.

Data representative of the conditions and results obtained are as follows:

| | Shift #1 | Shift #9 | Shift #24 |
|---|---|---|---|
| Dry feed, lbs./hr | 1,077 | 535 | 235 |
| Product, lbs./hr | 127 | 173 | 290 |
| New anhydrous, percent of feed | 11.8 | 32.4 | 113 |
| Liquor—Baumé ° (21° C.) | 45.6 | [1] 42 | 51.6 |

| | Feed | Product | Feed | Product | Feed | Product |
|---|---|---|---|---|---|---|
| Bulk density (tamped) | 89.7 | 90.1 | 87.2 | 89.8 | 88 | 87.7 |
| Screen distribution: | | | | | | |
| 10 M, percent | 6.3 | 11.6 | 4.3 | 19.3 | 0.6 | 30.6 |
| −10+20 M, percent | 36.9 | 51.6 | 35.1 | 69.2 | 27.8 | 62.2 |
| −20+48 M, percent | 43.3 | 37.1 | 50.1 | 15.9 | 46.3 | 7.1 |
| −48+65 M, percent | 2.9 | 0.5 | 3.5 | 0.3 | 5.1 | trace |
| −65 | 10.6 | 0.2 | 7.0 | 0.3 | 20.2 | trace |
| Analysis: | | | | | | |
| $CO_2$, percent | | 0.90 | | 0.68 | | 0.27 |
| $H_2O$, percent | | 1.06 | | 1.46 | | 1.75 |
| Insoluble, percent | | 0.01 | | 0.01 | | 0.01 |

[1] The minimum gravity used for one shift in this run was 36.7° Baumé (measured at 21° C.).

ADVANTAGES OF INVENTION

The process of this invention results in novel products having the following advantages and useful properties when compared with present commercial anhydrous sodium metasilicate.

(1) More rapid and uniform dissolving rates in water;
(2) Particles of more uniform size and globular shape;
(3) Less dust in a given weight or volume of product, resulting in lesser nasal irritation during handling;
(4) Higher purity by reduction in $CO_2$, $SO_2$, etc.;
(5) There is less size separation during handling and shipment;
(6) Only a simple screening step is required to obtain a product within a narrow size range;
(7) The particles have less tendency to cake or lump;
(8) Insoluble matter per unit weight approaches zero;
(9) Is readily mixable with other cleaning chemicals to produce uniformly sized cleaning compositions;
(10) Has a more desirable color.

Those skilled in the chemical arts, and particularly in the art to which this invention pertains will readily appreciate that many modifications of the basic invention set forth here are possible. For example, wherein the foregoing description has been specifically directed to the use of aqueous sodium metasilicate solutions, obviously no invention would be involved in using instead other sodium silicate solutions which would cause the formation of a final product having a Na$_2$O:SiO$_2$ ratio between 0.95 and 1.25 and applicants specifically intend to encompass such solutions and products under the "doctrine of reasonable equivalents." Likewise, we may choose our conditions so that as much as 10 or 15% of H$_2$O remains in the final particles resulting in a product of even higher rate of solution.

We also consider that the principles of this process may be extended to other solid alkali silicates, whether crystalline or not. For instance, liquors of more alkaline ratio such as the sodium sesquisilicate or sodium orthosilicate may be coated on a chosen fine solid base with the production of substantially anhydrous products. On the other hand, dry powders of more siliceous ratio such as Na$_2$O·2SiO$_2$ or Na$_2$O·22SiO$_2$ may be formed by partially dehydrating the required liquid in essentially the same process. Such free flowing products may contain 10–25% H$_2$O.

In a somewhat different sense, hydrated crystalline products such as sodium metasilicate five hydrate may be formed by coating fine particles with a concentrated sodium metasilicate liquor and permitting the liquor to dry by crystallization rather than dehydration.

It is also obvious that this process lends itself to the production of mixed detergents wherein one or more of the coats may be another solid such as an alkaline phosphate for instance.

What is claimed is:

1. A process for manufacturing substantially anhydrous crystallized sodium metasilicate which comprises carrying out the following steps:
   (a) introducing a plurality of small solid particles no larger than 48 mesh of crystallized anhydrous sodium metasilicate at a temperature above 130° C. into a coating zone so as to form a moving mass of small crystallized particles,
   (b) also spraying into said coating zone aqueous sodium metasilicate liquor which has a boiling point above 105° C. and thereby coating a liquid film of said aqueous sodium metasilicate liquor on at least a substantial portion of the exterior surface of said moving mass of small particles of solid crystalline anhydrous sodium metasilicate thus causing the liquor to crystallize as a layer of anhydrous sodium metasilicate on the small particles,
   (c) maintaining said moving mass of film covered particles above the boiling point of the aqueous sodium metasilicate liquor by applying additional heat in the form of a heated gas stream so as to cause evaporation from said liquor film of water freed by said crystallization,
   (d) repeating the above coating and film conversi( steps until the size of the anhydrous crystalline soc um metalsilicate particles has increased to the d sired extent.

2. A process according to claim 1 wherein the evap ration of said water is carried out at a temperature with the range of about 100–180° C.

3. The process of claim 1 wherein the aqueous sodiu silicate is applied to the solid particlees of anhydrou sodium silicate at intermittent intervals.

4. The process of claim 2 wherein superheated stea is used as the heating medium.

5. The process of claim 1 wherein combustion gas at a temperature in excess of 200° C. are used as the dr ing medium.

6. As a new article of manufacture a smooth, sphei cal, crystalline, a substantially anhydrous sodium met silicate particle free of sharp edges, points and fines caus( by grinding comprising a central core of crystalline a hydrous sodium metasilicate that is smaller than about ∠ mesh surrounded by a plurality of concentric crystalliz( layers of anhydrous sodium metasilicate, and having particle size greater than 65 mesh with less than abo 0.02% insoluble impurities.

7. A flowable mass of anhydrous sodium metasilica consisting essentially of globular particles, each globul: particle consisting of concentric layers of fine crysta around a central seed particle that is smaller than abo 48 mesh and including less than about 1.5% of sodiu carbonate and other water soluble imprities and less tha about 0.02% of water insoluble impurities and being fr( of dust particles caused by drying and crushing and beir relatively non-caking.

8. A globular particle of anhydrous sodium metasilica consisting essentially of fine crystals disposed in conce carbonate and other water soluble impurities and less tha about 48 mesh and including less than about 1.5% ( water soluble impurities and less than about 0.02% ( water insoluble impurities and free of dust particle caused by grinding and crushing.

References Cited by the Examiner

UNITED STATES PATENTS

| 2,561,394 | 7/51 | Marshall | 159—4 |
| 2,582,206 | 1/52 | McDaniel | 23—110. |
| 2,860,034 | 11/58 | Mockrin | 23—313 |
| 2,926,079 | 2/60 | Smith | 23—313 |
| 3,092,489 | 6/63 | Smith | 23—313 |

MAURICE A. BRINDISI, *Primary Examiner.*

UNITED STATES PATENT OFFICE
CERTIFICATE OF CORRECTION

Patent No. 3,208,822                          September 28, 1965

Chester L. Baker et al.

It is hereby certified that error appears in the above numbered patent requiring correction and that the said Letters Patent should read as corrected below.

Column 1, line 27, for "uually" read -- usually --; line 42, for "floculent" read -- flocculent --; column 4, line 69, for "an dagain" read -- and again --; column 5, line 60, for "metalsilicate" read -- metasilicate --; column 6, line 60, for "-10+65 M------23" read -- +10 M------0.0 --; column 7, after line 51, insert the following analytical data:

```
Bulk density
Tamped      lbs. cu. ft------75
Untamped    lbs. cu. ft------62
``` line 63, for "sicilate" read -- silicate --; column 10, in the table, first column, lines 9, 10 and 11, strike out superscript "7", each occurrence; same table, same column, lines 14 and 15, for "CO$^2$" and "H$^2$O" read -- $CO_2$ --, and $H_2O$ --; same table, third column, line 7 from the bottom, the indistinct number should read -- 50.6 --; column 11, line 16, for "$Na_2O \cdot 22SiO_2$" read -- $Na_2O \cdot 3.22SiO_2$ --; column 12, line 3, for "metalsilicate" read -- metasilicate --; line 9, for "particlees" read -- particles --; line 30, for "imprities" read -- impurities --; line 36, strike out "carbonate and other water soluble impurities and less than" and insert instead -- tric layers around a central seed particle that is less than --.

Signed and sealed this 18th day of October 1966.

(SEAL)
Attest:

ERNEST W. SWIDER
Attesting Officer

EDWARD J. BRENNER
                                       Commissioner of Patents